Dec. 2, 1924.

T. B. SLATE

HIGH PRESSURE PISTON

Filed Oct. 23, 1923

1,517,593

INVENTOR.
Thomas B. Slate
BY
Lester L. Sargent
ATTORNEYS.

Patented Dec. 2, 1924.

1,517,593

UNITED STATES PATENT OFFICE.

THOMAS B. SLATE, OF ELMHURST, NEW YORK, ASSIGNOR, BY MESNE ASSIGNMENTS, TO PREST-AIR CORPORATION, OF NEW YORK, N. Y., A CORPORATION OF DELAWARE.

HIGH-PRESSURE PISTON.

Application filed October 23, 1923. Serial No. 670,274.

*To all whom it may concern:*

Be it known that I, THOMAS B. SLATE, a citizen of the United States, residing at Elmhurst, Long Island, in the county of Queens and State of New York, have invented a new and useful High-Pressure Piston, of which the following is a specification.

The object of my invention is to provide a piston having an absolute seal or pressure and to provide novel resilient means for obtaining such a seal in a high pressure piston. I attain these and other objects of my invention by the mechanism illustrated in the accompanying drawings, of which—

Figure 1:
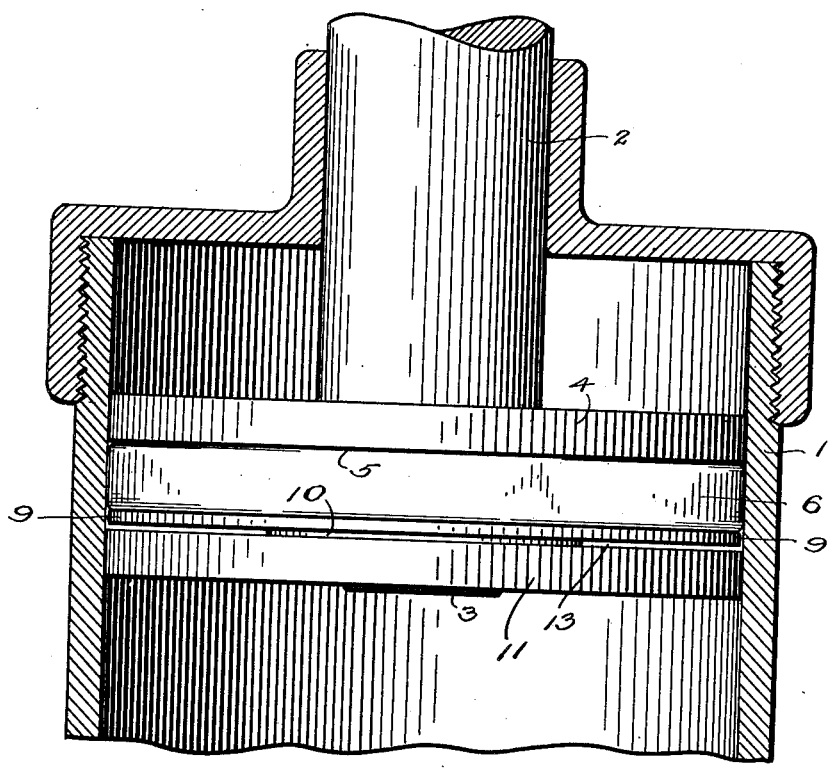
Figure 2:
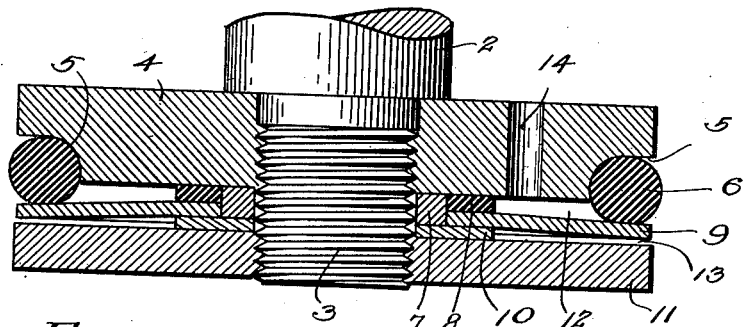

Figure 1 is a vertical section through a cylinder showing my piston in side elevation; and Fig. 2 is a transverse section through my piston showing the working principle of same.

Like numerals indicate like parts in each of the views.

Referring to the accompanying drawings, 1 represents a conventional cylinder in which the piston operates, and 2 represents a conventional piston rod having a reduced threaded end 3 to engage the piston. I provide a piston head 4 having an annular peripheral groove 5 to receive the resilient packing ring 6. I provide a metal spacing ring 7, a rubber washer 8 encircling ring 7, and a spring plate 9 which in operation may adopt a slightly convex contour. I also provide a metal spacing washer 10 under the inner portion of plate 9, the inner edge of which contacts with the metal spacing washer 7, as shown in Fig. 2. I further provide a metal plate 11 acting as a lock nut or piston assembly element. A space 12 is left between spring plate 9 and piston head 4 to allow pressure under the piston in operation to compress the packing ring 6 according to the amount of pressure applied to the piston. I provide a vent hole 14 through piston 4 to allow the air caged in space 12 to escape, giving full effect of compression pressure on spring plate 9.

This invention is especially adapted for use on all automatic or hydraulic pistons where an absolute seal or pressure is required, but is especially valuable as in pneumatic jacks, pneumatic hoists, and all types of hydraulic lifts or hoists. Especial attention is drawn to the fact that rubber washer 8 and packing ring 6 make an absolute seal between spring plate 9 and piston head 4. This is necessary to make the piston operative.

What I claim is:

1. In a high pressure piston, the combination of a piston having an annular peripheral groove, a resilient packing ring mounted in said groove, a spring plate in contact with said packing ring, a resilient washer on the side of the spring plate nearest the piston spacing it from the piston to provide an air chamber between the piston, the spring plate, the packing ring and the resilient washer, spacing elements for the opposite side of the spring plate and the inner annular edge thereof, and a piston assembly plate in contact with one of said spacing elements.

2. In a high pressure piston, the combination with a piston rod having a reduced threaded end, of a piston operatively mounted on the end of said piston rod, said piston having an annular groove extending inward from its peripheral surface, a spring plate, spaced resilient elements interposed between the spring plate and the piston, one of said elements being in operative contact with the surface of the cylinder in which the piston operates, a spacing washer engaging the inner edge of the spring plate, and a second metal spacing washer engaging the under side of the spring plate.

3. In a high pressure piston, the combination with a piston rod having a reduced threaded end, of a piston operatively mounted on the end of said piston rod, said piston having an annular groove extending inward from its peripheral surface, a spring plate, spaced resilient elements interposed between the spring plate and the piston, one of said elements being in operative contact with the surface of the cylinder in which the piston operates, a spacing washer engaging the inner edge of the spring plate, a second metal spacing washer engaging the under side of the spring plate, and a lock plate engaging on the threaded end of the piston rod to hold the piston elements in their operative assembled position, the piston having a vent hole for the escape of air in the air space between the resilient elements when the piston is under pressure.

4. In a high pressure piston, the combination of a piston having an annular peripheral groove, a resilient packing ring mounted in said groove, a spring plate in contact with said packing ring, a resilient washer on the side of the spring plate nearest the piston spacing it from the piston to provide an air chamber between the piston, the spring plate, the packing ring and the resilient washer, spacing elements for the opposite side of the spring plate and the inner annular edge thereof, and a piston assembly plate in contact with one of said spacing elements, the piston having a vent hole for the escape of air in the air space between the resilient elements when the piston is under pressure.

THOMAS B. SLATE.